United States Patent
Lee et al.

(10) Patent No.: US 10,481,447 B2
(45) Date of Patent: Nov. 19, 2019

(54) LCD DISPLAY DEVICE

(71) Applicant: A.U. VISTA, INC., Milpitas, CA (US)

(72) Inventors: Seok-Lyul Lee, Hsin-chu (TW);
Fang-Chen Luo, Milpitas, CA (US);
Adiel Abileah, Milpitas, CA (US);
Willem Den Boer, Milpitas, CA (US)

(73) Assignee: A.U. Vista, Inc., Milpitas, CA (US)

( * ) Notice: Subject to any disclaimer, the term of this patent is extended or adjusted under 35 U.S.C. 154(b) by 68 days.

(21) Appl. No.: 15/797,342

(22) Filed: Oct. 30, 2017

(65) Prior Publication Data

US 2019/0129225 A1    May 2, 2019

(51) Int. Cl.
| | |
|---|---|
| *G02F 1/1347* | (2006.01) |
| *G02F 1/1368* | (2006.01) |
| *G02F 1/1335* | (2006.01) |
| *G02F 1/1362* | (2006.01) |
| *G09G 3/36* | (2006.01) |
| *G02F 1/1345* | (2006.01) |
| *G02F 1/1333* | (2006.01) |

(52) U.S. Cl.
CPC ........ *G02F 1/13471* (2013.01); *G02F 1/1362* (2013.01); *G02F 1/1368* (2013.01); *G02F 1/133504* (2013.01); *G02F 1/133514* (2013.01); *G02F 1/133609* (2013.01); *G02F 1/136286* (2013.01); *G09G 3/3685* (2013.01); *G02F 1/13452* (2013.01); *G02F 1/133528* (2013.01); *G02F 2001/133302* (2013.01); *G02F 2001/133548* (2013.01); *G02F 2001/133562* (2013.01); *G02F 2201/52* (2013.01); *G09G 2310/08* (2013.01)

(58) Field of Classification Search
CPC .................................................. G02F 1/13471
See application file for complete search history.

(56) References Cited

U.S. PATENT DOCUMENTS

| | | | |
|---|---|---|---|
| 8,884,290 B2 | 11/2014 | Oh et al. | |
| 2002/0054261 A1* | 5/2002 | Sekiguchi | G02F 1/13338 349/122 |
| 2008/0272375 A1 | 11/2008 | Oh et al. | |
| 2009/0147186 A1* | 6/2009 | Nakai | G02F 1/13471 349/74 |
| 2010/0277443 A1* | 11/2010 | Yamazaki | G06F 1/1616 345/204 |

(Continued)

FOREIGN PATENT DOCUMENTS

CN    106932952    7/2017

*Primary Examiner* — Sang V Nguyen
(74) *Attorney, Agent, or Firm* — Ware, Fressola, Maguire & Barber LLP

(57) ABSTRACT

A liquid crystal display device is formed from a first display panel and a second display panel in a stack configuration. Each of the first display panel and the second display panel has a TFT substrate. A signal circuit is disposed on the TFT substrate of the first display panel to provide data signals and timing signals. A signal connector is used to covey the data signals and timing signals from the first display panel to the second display panel. Each of the first display panel and the second display panel has a plurality of gate lines, including a first gate line and a last gate line. In the stacked configuration, the last gate line of the first display panel and last gate line of the second display panel are adjacent to the signal connector.

18 Claims, 16 Drawing Sheets

(56) References Cited

U.S. PATENT DOCUMENTS

| | | | |
|---|---|---|---|
| 2013/0229600 A1* | 9/2013 | Takama | G02B 27/2214 |
| | | | 349/77 |
| 2016/0170702 A1* | 6/2016 | Jiang | G02F 1/133528 |
| | | | 345/618 |
| 2018/0046011 A1* | 2/2018 | Tang | G02B 6/00 |
| 2018/0231829 A1* | 8/2018 | Itou | G02F 1/133345 |
| 2018/0275445 A1* | 9/2018 | Katagiri | G02F 1/13452 |
| 2018/0308832 A1* | 10/2018 | Shin | H01L 25/162 |
| 2019/0018281 A1* | 1/2019 | Gam | G02F 1/133514 |

\* cited by examiner

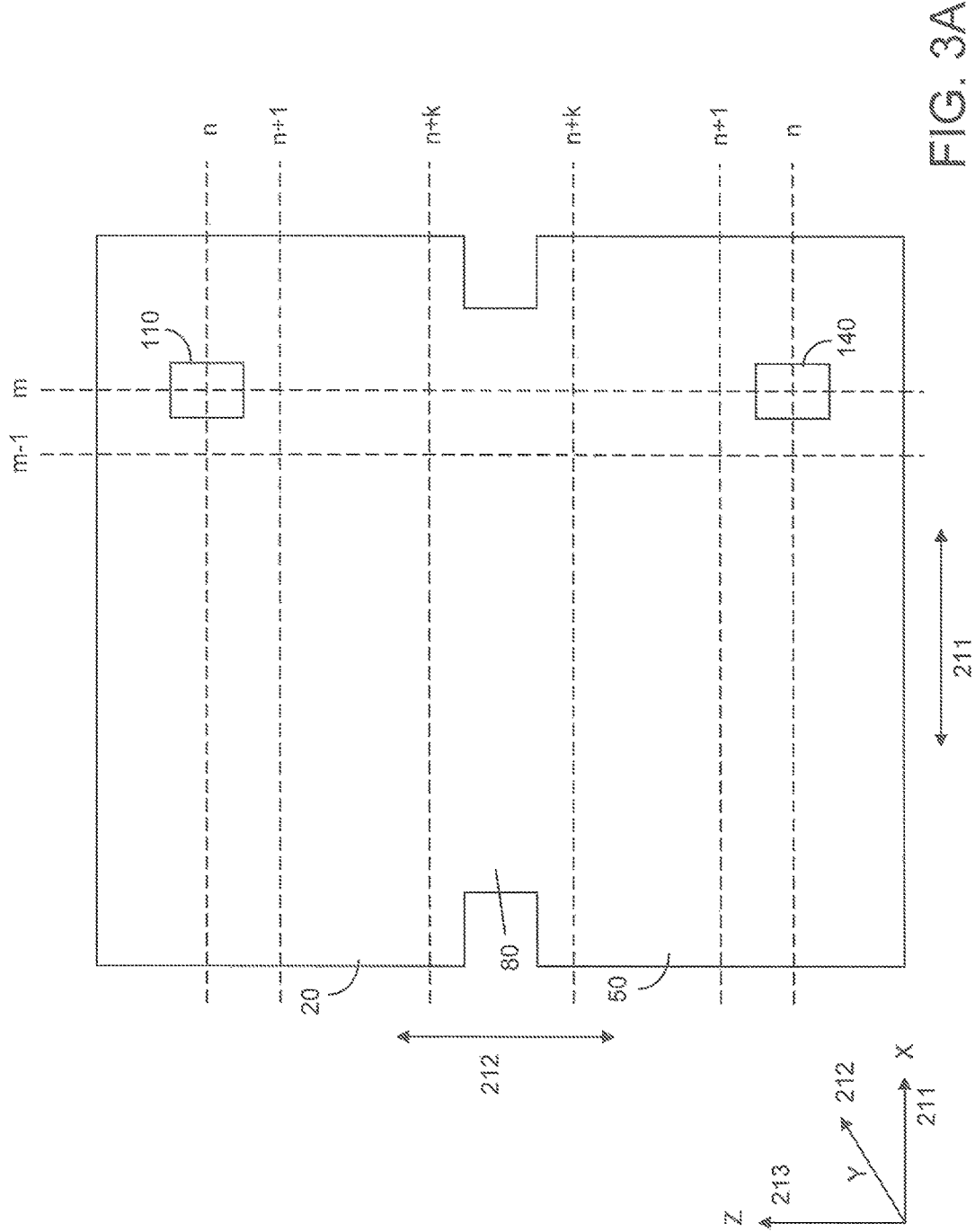

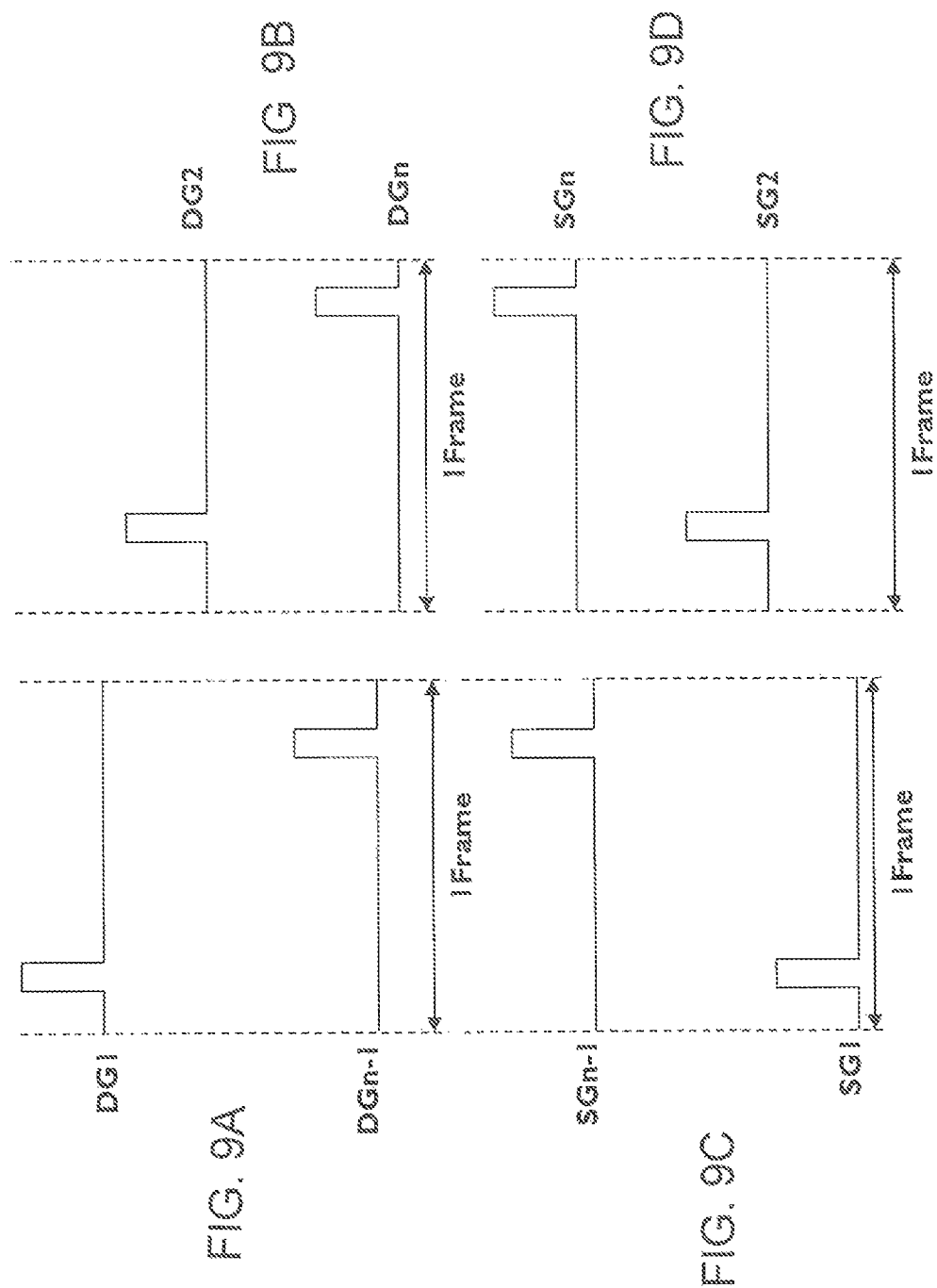

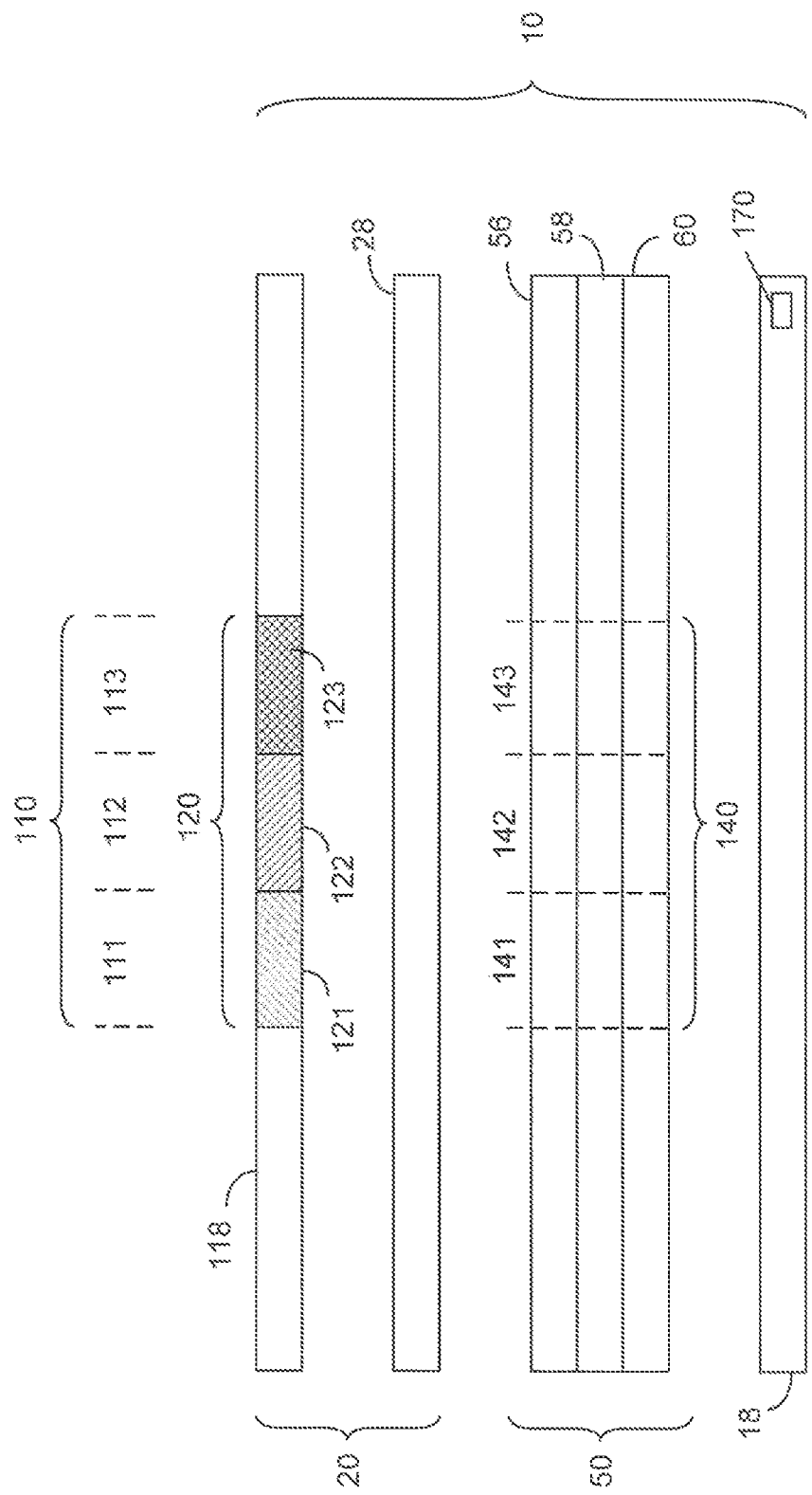

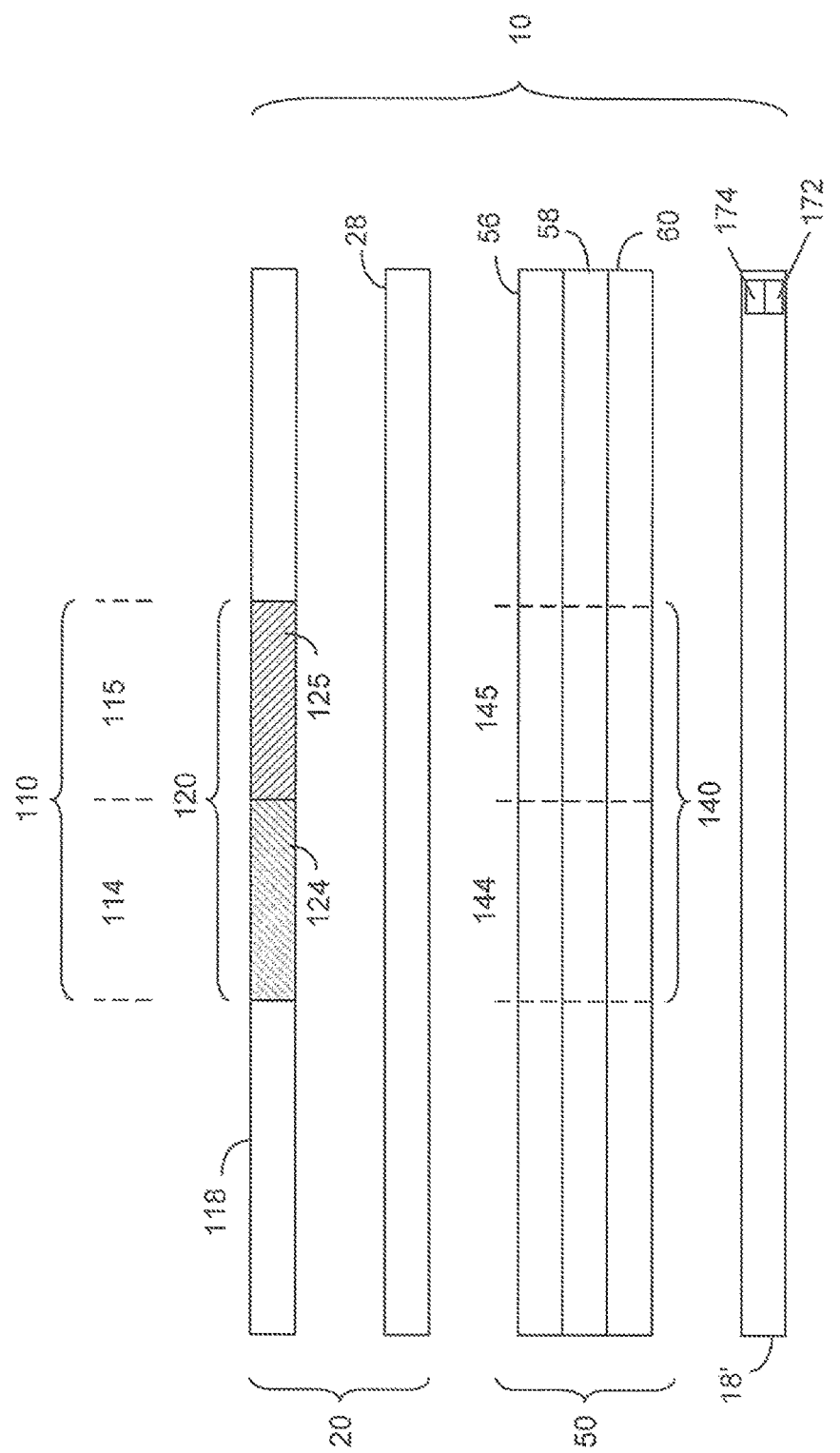

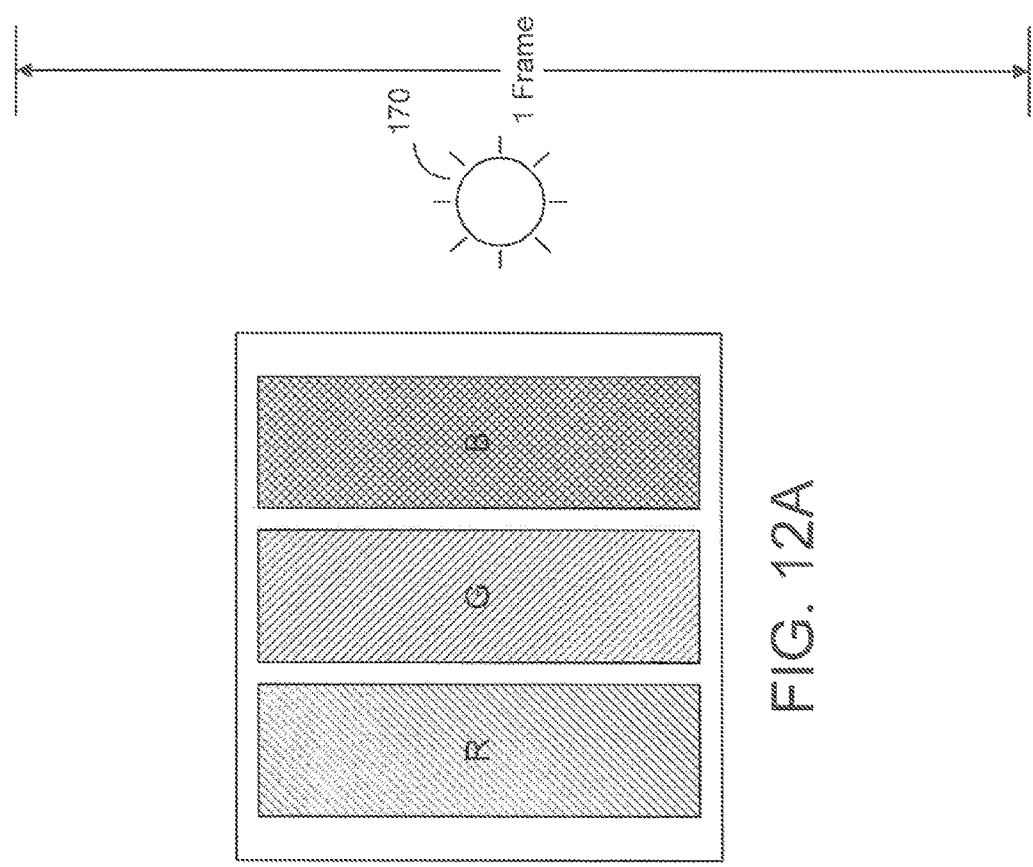

LCD DISPLAY DEVICE

TECHNICAL FIELD

The present invention relates generally to a display panel and, more specifically, to an LCD panel with high contrast ratio.

BACKGROUND OF THE INVENTION

High contrast ratio (CR) is a critical requirement for many display applications. In liquid-crystal display (LCD), high contrast ratio is more difficult to achieve because LCD is a non-emissive display. Many different technologies have been used to improve the contrast ratio. However, higher contrast ratio may cause the lower transmittance of the display.

There is a need to provide an LCD panel having high contrast ratio with improved transmittance.

SUMMARY OF THE DISCLOSURE

The present invention is concerned with a liquid crystal display device consisting of two display panels in a stacked configuration with high contrast ratio and improved transmittance. A signal connector is used to convey the data signals and timing signals from the first display panel to the second display panel. As such, only one set of driver ICs is required.

Thus, the first aspect of the present invention is a display device, comprising: a first display panel and a second display panel arranged for stacking into a panel stack, the panel stack having a first stack side and an opposing second stack side;

a diffuser located in the panel stack between the first display panel and the second display panel;

a backlight unit located in the panel stack near the second stack side;

a signal circuit, and a signal connector having a first connector end and a second connector end, wherein the first display panel comprises:
a color filter substrate;
a first TFT substrate, and
a first liquid crystal layer disposed between the color filter substrate and the first TFT substrate, and
the second display panel comprises:
a support substrate;
a second TFT substrate;
a second liquid crystal layer disposed between the support substrate and the second TFT substrate, and wherein the first connector end of the signal connector is electrically connected to the first TFT substrate, and the second connector end of the signal connector is electrically connected to the second TFT substrate, and wherein the signal circuit is arranged to provide electronic signals to the first TFT substrate, and also to provide the electronic signals to the second TFT substrate via the signal connector.

According to an embodiment of the present invention, the display device further comprises:

a first polarizer element disposed on the color filter substrate, spaced from the first liquid crystal layer;

a second polarizer element disposed between the first TFT substrate and the second TFT substrate, and a third polarizer element between the support substrate and the backlight unit.

According to an embodiment of the present invention, the display device further comprises:

a first polarizer element disposed on the color filter substrate, spaced from the first liquid crystal layer;

a second polarizer element disposed between the first TFT substrate and the diffuser;

a third polarizer element disposed between the diffuser and the second TFT substrate, and a fourth polarizer element disposed between the support substrate and the backlight unit.

According to an embodiment of the present invention, the first polarizer element comprises an optical polarizer; the second polarizer element comprises a wire-grid polarizer, the third polarizer element comprises a wire-grid polarizer and the fourth polarizer element comprises a wire-grid polarizer.

According to an embodiment of the present invention the first display panel comprises a plurality of color pixels arranged in a two dimensional array comprising a plurality of pixel rows along a first direction and a plurality of pixel columns along a different second direction, and the second display panel comprises a plurality of pixel cells arranged in a two dimensional array comprising a plurality of cell rows along the first direction and a plurality of cell columns along the second direction, each of the plurality of pixel cells corresponding to and substantially aligned with a different one of the plurality of color pixels in the display stack in a third direction, the third direction substantially perpendicular to the first direction and perpendicular to the second direction.

According to an embodiment of the present invention, the signal circuit comprises a signal driver circuit and a timing control circuit and the electronic signals comprise data signals and timing signals, the signal driver circuit arranged to provide the data signals and the timing control circuit arranged to provide the timing signals to the first TFT substrate and the second TFT substrate.

According to an embodiment of the present invention, each of the first TFT substrate and the second TFT substrate has a plurality of gate lines, including a first gate line and a last gate line, wherein the last gate line of the first TFT substrate is located adjacent to the first connector end of the signal connector and the last gate line of the second TFT substrate is located adjacent to the second connector end of the signal connector.

According to an embodiment of the present invention, the first TFT substrate comprises a first glass substrate and the second TFT substrate comprises a second glass substrate, each of the first glass substrate and the second glass substrate comprises a first substrate side and an opposing second substrate side, wherein the first substrate side of the first glass substrate comprises a first gate driver, and the second substrate side of the first glass substrate comprises a second gate driver, and the first substrate side of the second glass substrate comprises a third gate driver, and the second substrate side of the second glass substrate comprises a fourth gate driver, and wherein the first gate driver and the second gate driver are arranged to receive the timing signals from the signal driver circuit and to provide gate line signals to the plurality of gate lines in the first TFT substrate, and the third gate driver and the fourth driver are arranged to receive the timing signals from the signal driver circuit and to provide gate line signals to the plurality of gate lines in the second TFT substrates.

According to an embodiment of the present invention, the gate line signals provided to the gate lines in the first TFT substrate by the first gate driver and the gate line signals provided to the gate lines in the first TFT substrate by the second gate driver are the same, and wherein the gate line signals provided to the gate lines in the second TFT substrate by the third gate driver and the gate line signals provided to the gate lines in the second TFT by the fourth gate driver are the same.

According to an embodiment of the present invention, the gate line signals provided to the gate lines in the first TFT substrate by the first gate driver and the gate line signals provided to the gate lines in the first TFT substrate by the second gate driver are arranged in an interlaced manner, and wherein the gate line signals provided to the gate lines in the second TFT substrate by the third gate driver and the gate line signals provided to the gate lines in the second TFT substrate by the fourth gate driver are arranged in an interlaced manner.

According to an embodiment of the present invention, the gate line signals to the first gate line in the first TFT substrate and the gate line signals to the first gate line in the second TFT substrate are simultaneously provided, and wherein the gate line signals to the last gate line in the first TFT substrate and the gate line signals to the last gate line in the second TFT substrate are simultaneously provided.

According to an embodiment of the present invention, each of the first gate driver, the second gate driver, the third gate driver and the fourth gate driver comprises a plurality of shift registers arranged to provide the gate line signals in a sequential manner.

According to an embodiment of the present invention, the color filter substrate comprises a first base substrate and a color filter layer disposed on the first base substrate, the color filter layer comprises a plurality of color-filter cells, each color-filter cell associated with a different one of the plurality of color pixels.

According to an embodiment of the present invention, each of the color filter cells comprises a red filter cell, a green filter cell and a blue filter cell, and wherein the backlight unit comprises a white-light source.

According to an embodiment of the present invention, each of the color filter cells comprises a magenta filter cell and a green filter cell, and wherein the backlight unit comprises two light sources, comprising a yellow light source and a cyan light source.

According to an embodiment of the present invention, the signal driver circuit is arranged to provide the data signals to the plurality of color pixels in the first display panel and to the plurality of pixel cells in the second display panel in a frame time, the frame time comprises a first half-frame time and a second half-frame time, and wherein the two light sources are alternately turned on with one of the two light sources arranged to turn on in the first half-frame time, and the other of the two light sources arranged to turn on in the second half-frame time.

According to an embodiment of the present invention, the area of the green filter cell is smaller than the area of the magenta filter cell.

The second aspect of the present invention is a display device, comprising:
a backlight unit, and a liquid crystal display panel disposed adjacent to the backlight unit, wherein
the liquid crystal display panel comprises:
 a first polarizer;
 a color filter substrate disposed adjacent to the first polarizer, wherein the color filter substrate comprises a plurality of color-filter cells, each of the color-filter cells comprising a magenta filter cell and a green filter cell;
 a TFT substrate spaced from the color filter substrate,
 a liquid crystal layer disposed between the color filter substrate and the TFT substrate, and
 a second polarizer disposed adjacent to the TFT substrate, and
the backlight unit comprises:
 a light source arranged to provide a source light;
 a light guide plate arranged to direct the source light for providing a guide light toward the liquid crystal display panel, and the light source comprises a yellow light source and a cyan light source arranged to turn on alternately for providing the source light.

According to an embodiment of the present invention, the TFT substrate comprises a plurality of pixel areas corresponding to the color filter cells in the color filter substrate, wherein data signals are provided to the plurality of pixel areas in a frame time, the frame time comprises a first half-frame time and a second half-frame time, and wherein one of the yellow light source and the cyan light source are arranged to turn on in the first half-frame time, and the other of the yellow light source and the cyan light source are arranged to turn on in the second half-frame time.

BRIEF DESCRIPTION OF THE DRAWINGS

FIG. 3A illustrates the spatial relationship of the pixels in the display panels.

FIGS. 9A and 9B illustrate the scanning pulses provided to different sides of the first display panel, according to another embodiment of the present invention.

FIGS. 9C and 9D illustrate the scanning pulses provided to different sides of the second display panels, according to the embodiment of the present invention as shown in FIGS. 9A and 9B.

FIG. 10 illustrates the relationship between the color filter cell and the pixel cell, according to an embodiment of the present invention.

FIG. 11A illustrates the relationship between the color filter cell and the pixel cell, according to another embodiment of the present invention.

FIG. 12A illustrates the illumination timing periods for the color pixels, according to the embodiment as shown in FIG. 10.

DETAILED DESCRIPTION OF THE INVENTION

Figure 1:
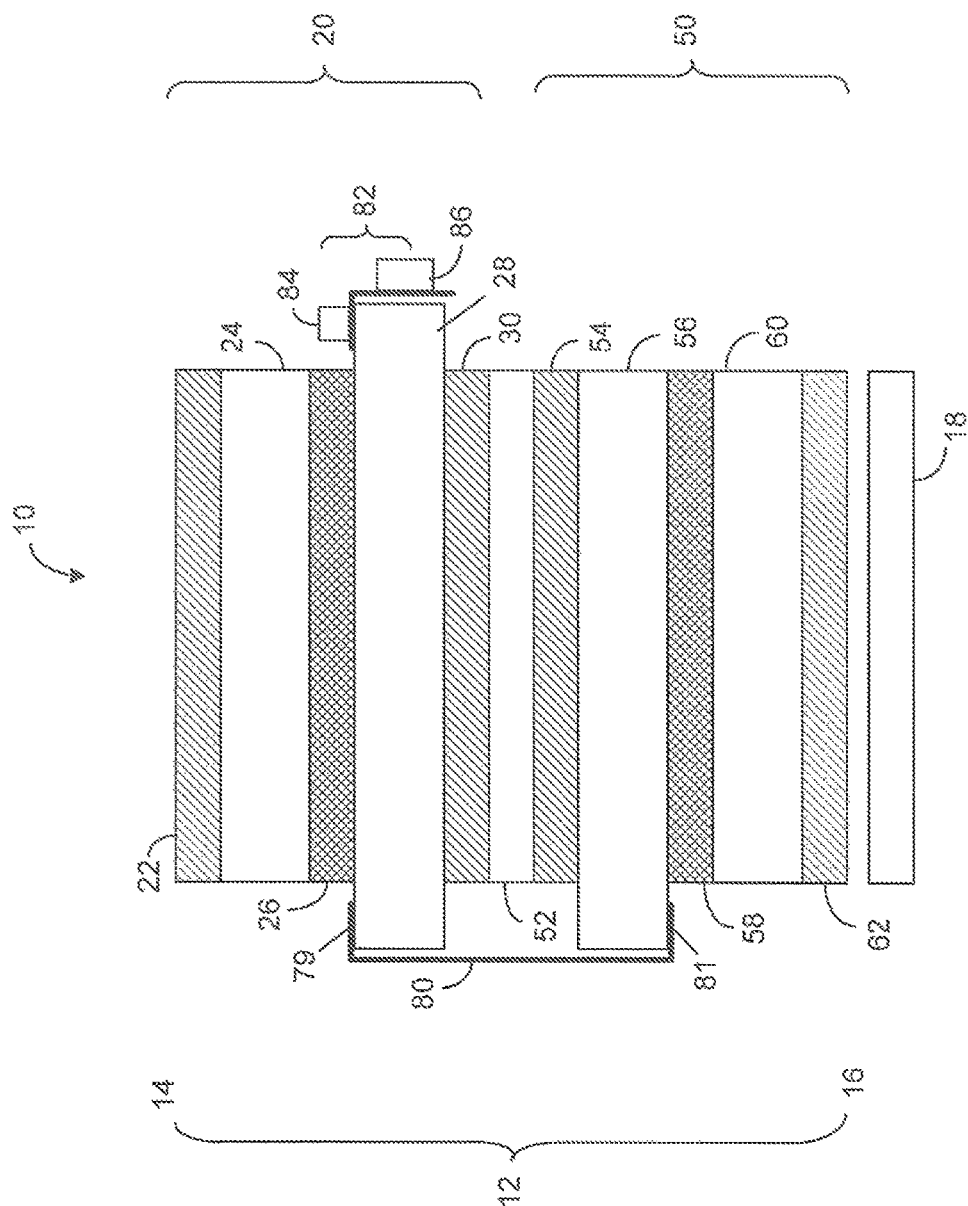
FIG. 1 shows the display device, according to an embodiment of the present invention.
Figure 2:
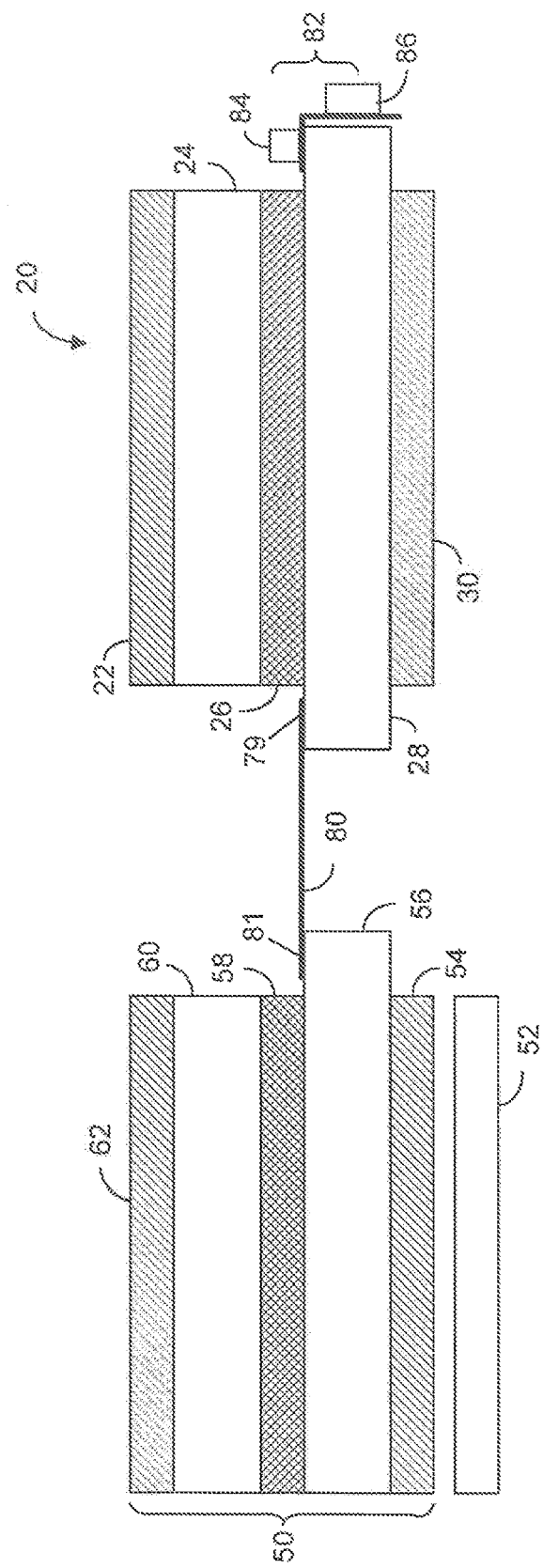
FIG. 2 shows the display panels to be stacked into the display device.

As seen in FIGS. 1 and 2, the display device 10, according to an embodiment of the present invention, is formed from a first display panel 20 and a second display panel 50. FIG. 1 shows the display device 10 in a stacked configuration and FIG. 2 shows the signal connection between the first display panel 20 and the second display panel 50. The first display panel 20 includes a color filter substrate 24, a first TFT substrate 28, and a first liquid crystal layer 26 disposed between the color filter substrate 24 and the first TFT substrate 28. The second display panel 50 includes a support substrate 60, a second TFT substrate 56, and a second liquid crystal layer 58 disposed between the support substrate 60 and the second TFT substrate 56. The color filter substrate 24 has a color filter layer 118 to provide a plurality of color filter cells 120 (see FIGS. 10, 11A, 11B). Each of the first and second TFT substrates 28, 56 has an electronic layer adjacent to a liquid crystal layer. It is known in the art that the electronic layer includes a two-dimensional array of sub-areas having TFT switching elements and capacitors to control the charging and discharging in the pixels of the display device.

According to an embodiment of the present invention, the first display panel 20 has a first polarizer element 22 disposed adjacent to the color filter substrate 24 and a second polarizer element 30 disposed adjacent to the first TFT substrate 28. The second display panel 50 has a third polarizer element 54 disposed adjacent to the second TFT substrate 56 and a fourth polarizer element 62 disposed adjacent to the support substrate 60. When the display device 10 is in the stacked configuration as shown in FIG. 1, the display device 10 also has a diffuser 52 disposed between the first display panel 20 and the second display panel 50. According to an embodiment of the present invention, only one of the second and third polarizer elements is disposed between the first TFT substrate 28 and the second TFT substrate 56. According to one embodiment of the present invention, the display device 10 has the second polarizer element 30 disposed between the first TFT substrate 28 and the diffuser 52. According to another embodiment of the present invention, the display device 10 has the third polarizer 54 disposed between the second TFT substrate 56 and the diffuser 52.

According to an embodiment of the present invention, the first polarizer element 22 is an optical polarizer, and each of the second, third and fourth polarizer elements 30, 54, 62 is a wire-grid polarizer. As seen in FIGS. 1 and 2, a signal connector 80, such as a flexible printed circuit (FPC) is used to convey data signals and timing signals from the first display panel 20 to the second display panel 50. The signal connector 80 has a first connector end 79 electrically connected to the first TFT substrate 28 and a second connector end 81 electrically connected to the second TFT substrate 56. According to an embodiment or the present invention, each of the TFT substrates 28 and 56 has a bonding pad arranged for attachment of a different connector end of the signal connector 80 before the display device 10 is folded into the stacked configuration of FIG. 1. The display device 10 also has a signal circuit 82 electrically connected to the first TFT substrate 28. The signal circuit 82 is arranged to provide electronic signals to the first TFT substrate 28 and, through the signal connector 80, to the second TFT substrate 56. The signal circuit 82 comprises a timing control circuit (T-Con) 86 and a driver IC 84. By using a signal connector 80 to convey electronic signals to both the first TFT substrate 28 and the second TFT substrate 56, the cost for having a separate driver IC circuit and a separate timing control circuit on the second display panel 50 is eliminated. Furthermore, the use of three wire-grid polarizers in place of optical polarizers can improve the transmittance of the display device and reduce the thickness of the display device.

According to the present invention, the diffuser 52 in the display device 10 is located between the first display panel 20 and the second display panel 50 when the first display panel 20 and the second display panel 50 are stacked into a panel stack 12. The panel stack 12 has a first stack side 14 and an opposing second stack side 16, and the optical polarizer 22 is located near the first stack side 12. The display device 10 also has a backlight unit 18 disposed in the panel stack 12 near the second stack side 14, adjacent to the second wire-grid polarizer 62.

Figure 3:
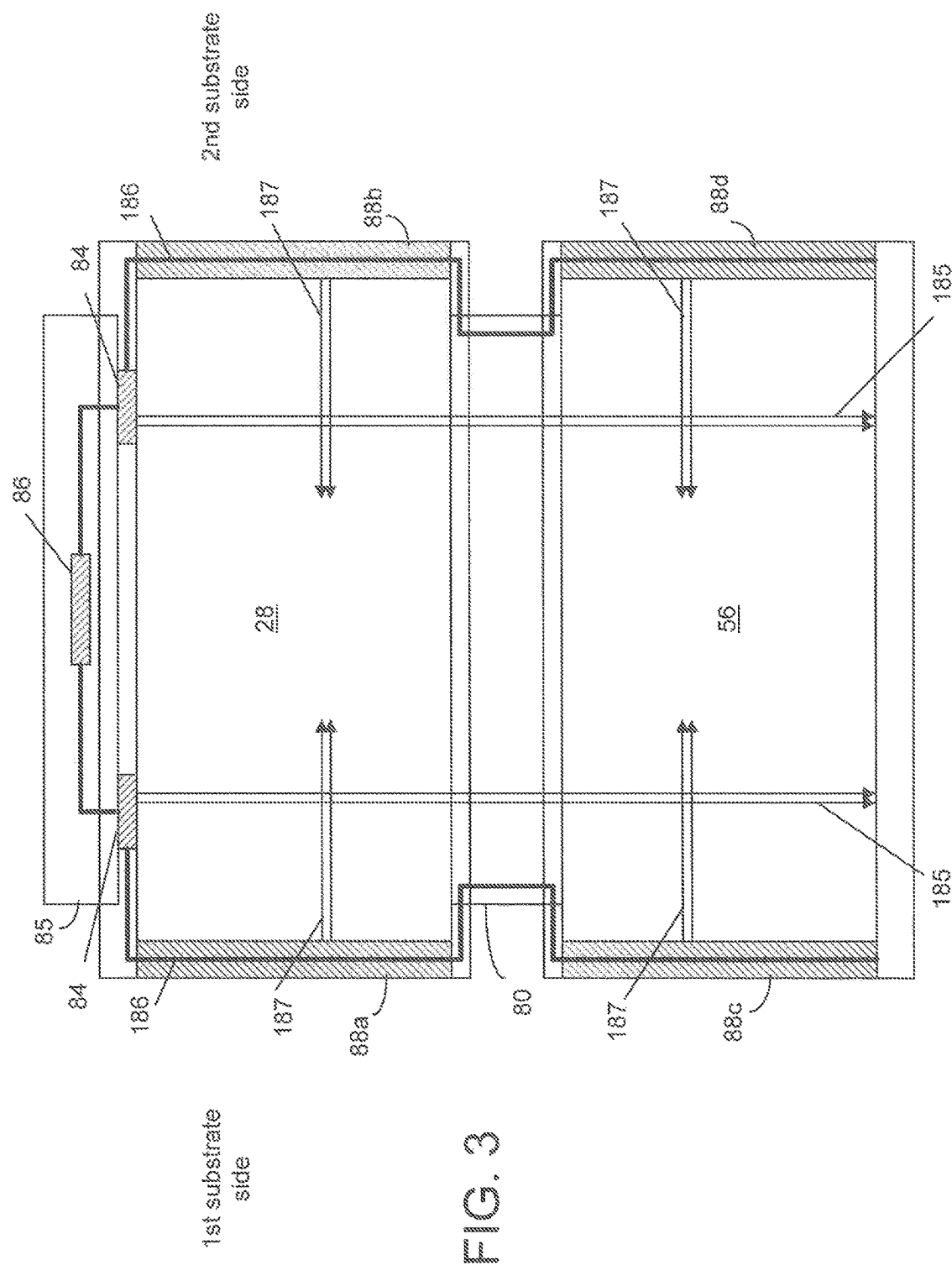
FIG. 3 illustrates the signal connection between the display panels.

FIG. 3 illustrates the signal connection between the display panels. As seen in FIG. 3, the driver IC 84 (shown in two parts) is disposed on the first substrate 28. The timing control circuit 86 is fabricated on a printed circuit 85 which is attached to the first TFT substrate 28. The timing control circuit 86 is arranged to provide timing signals to the driver IC 84. To provide gate-line signals to the first and second TFT substrate 28, 5, gate driver circuits are fabricated as gate-on-arrays (GOAs) on both sides of the first TFT substrate 28 as gate drivers 88a, 88b, and on both sides of the second TFT substrate 56 as gate drivers 88c, 88d. The gate driver circuits are arranged to receive timing signals 186 from the driver IC 84 and provide gate-line signals 187 to first and second TFT substrates 28, 56. The first and second TFT substrates 28, 56 are also arranged to receive data signals 185 from the driver IC 84.

It should be noted that the first display panel 20 has a color filter substrate 24, but the second display 50 only has a support substrate 60. The color filter substrate 24 has a color filter layer 118 to provide a plurality of color filter cells 120 (see FIG. 10). The color filter layer 118 and the TFT arrays (not shown) on the first TFT substrate 28, along with the first liquid crystal layer 26 and the associated polarizer elements, define a two-dimensional array of color pixels 110 (see FIGS. 10 and 11A). The support substrate 60 and the second TFT substrate 56, along with the second liquid crystal layer 58 and the associated polarizer elements, define a two-dimensional array of pixel cells 140 (see FIGS. 10 and 11A). Each of the pixel cells 140 in the second display panel 50 is corresponding to a different color pixel 110 in the first display panel 20. The pixel cells 140 and the color pixels 110 are arranged in two-dimensional arrays having rows and columns. As illustrated in FIG. 3A, the rows are organized in a first direction 211 and the columns are organized in the second direction 212. When the display device 10 is in the stacked configuration as shown in FIG. 1, the corresponding color pixel and pixel cell are spatially aligned in the third direction 213, which is substantially perpendicular to both the first direction 211 and the second direction 212. In FIG. 3A, n is row number and m is column number.

Figure 5:
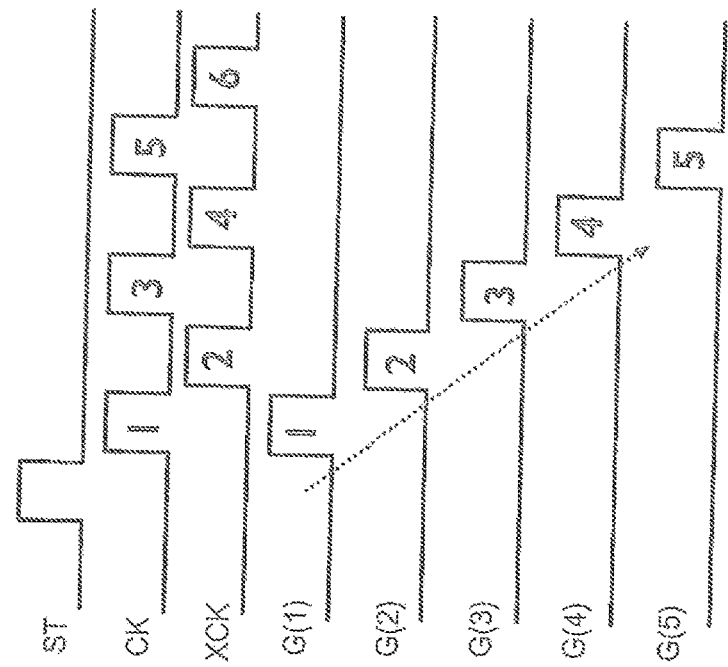
FIG. 5 is a time-chart showing the time sequence of various signals.
Figure 4:
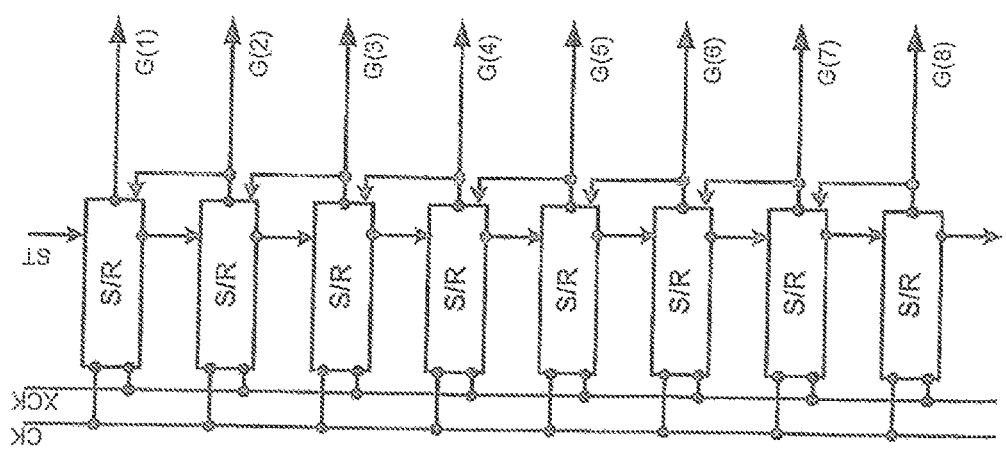
FIG. 4 shows the architecture of the gate-on-array to provide gate line signals to the display panels.
Figure 7:
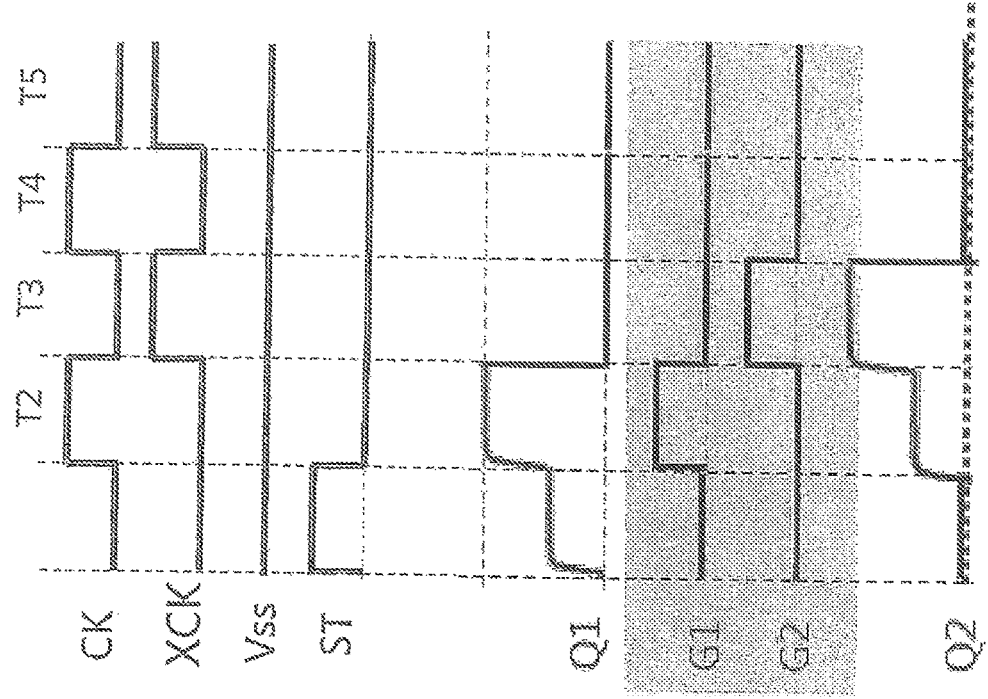
FIG. 7 is a time-chart showing the amplitude of various signals in a shift-register unit.
Figure 6:
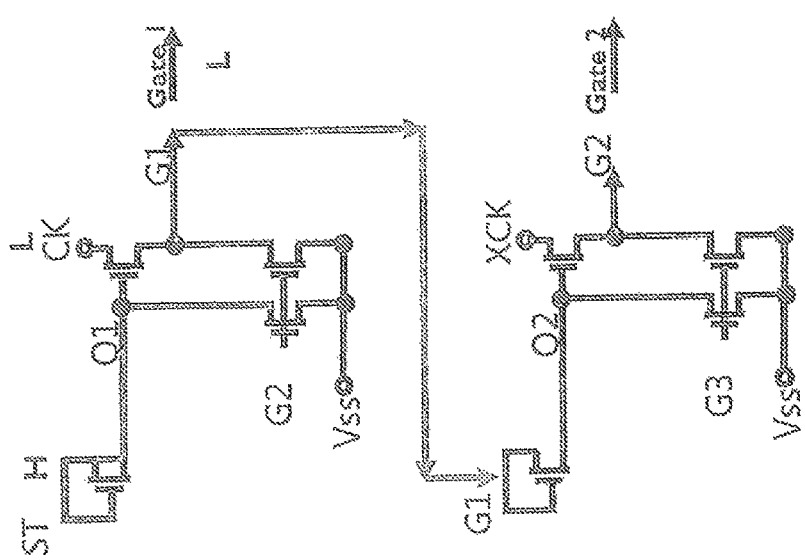
FIG. 6 is a shift-register unit for use in the gate-on-array.

FIG. 4 shows the architecture of the gate-on-arrays arranged to providing gate-line signals to the rows of color pixels in the first display panel 20 and the rows of pixel cells in the second display panel 50. As seen in FIG. 4, CK and XCK are clock signals arranged to provide reference signals to each of the shift register (S/R), and ST is the first stage start signal. G1-Gn are gate-line control signals. FIG. 5 is a time chart showing the time sequence of various signals in relationship to each other. FIG. 6 is a typical shift register. FIG. 7 is a time chart showing the voltage levels of various signals, where Q1, Q2 are reference points in the shift register as shown in FIG. 6.

Figure 8A:
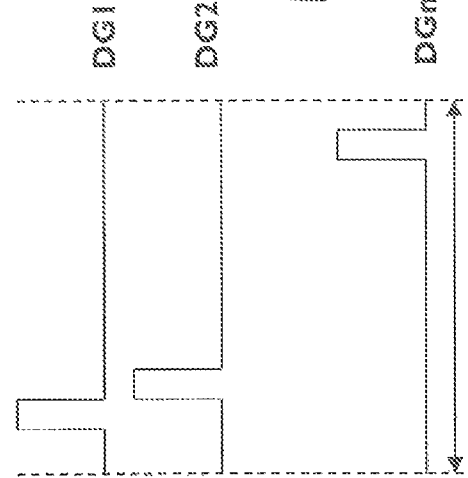
FIGS. 8A and 8B illustrate the scanning pulses provided to different sides of the first display panel, according to an embodiment of the present invention.
Figure 8B:
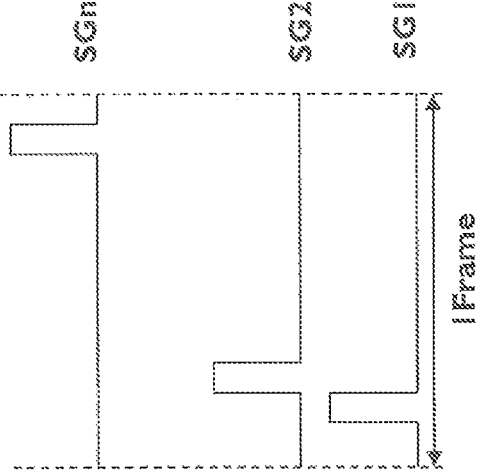
Figure 8C:
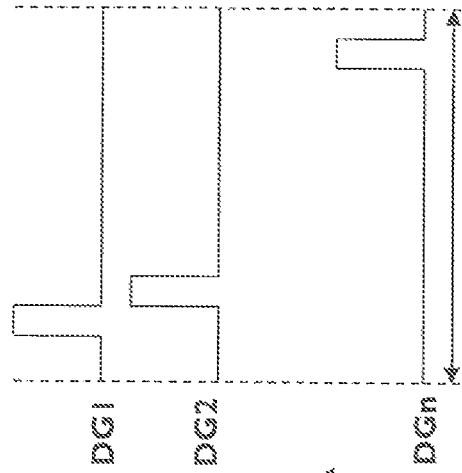
FIGS. 8C and 8D illustrate the scanning pulses provided to different sides of the second display panel, according to the embodiment of the present invention.
Figure 8D:
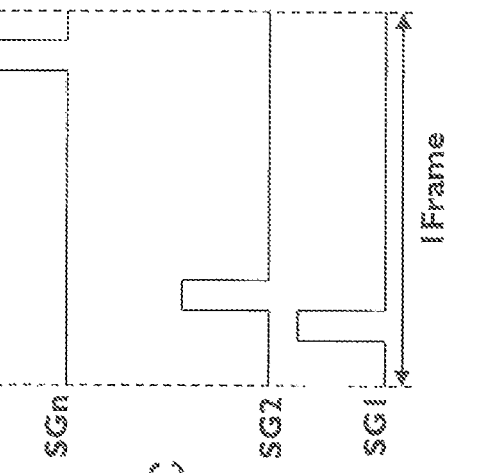

FIGS. 8A, 8B, 8C and 8D illustrate the scanning pulses or gate-line signals provided by the gate drivers 88*a*, 88*b*, 88*c* and 88*d* in the gate-on-arrays in the first and second TFT substrates 28, 56. In FIGS. 8A and 8B, the scanning pulses associated with the first display panel 20 are labeled as DG1, DG2, DGn. In FIGS. 8C and 8D, the scanning pulses associated with the second display panel 50 are labeled as SG1, SG2, . . . , SGn. It should be noted that the scanning direction of DG1, DG2, . . . , DGn follows a forward sequence while the scanning direction of SG1, SG2, . . . , SGn follows a backward sequence. As such, in the display device 10 as shown in FIG. 1, the scanning pulses for rows in the first display panel 20 and the scanning pulses in the corresponding rows in the second display panel 50 are synchronized. In FIGS. 8A and 8B, the scanning sequence on both sides of the first TFT substrate 28 is the same. In FIGS. 8C and 8D, the scanning sequence on both sides of the second TFT substrate 56 is the same. The shift registers in gate drivers 88*a*. 88*b*, 88*c* and 88*d* are said to perform progressive scanning.

FIGS. 9A, 9B, 9C and 9D illustrate the scanning pulses or gate-line signals provided by the gate drivers 88*a*, 88*b*, 88*c* and 88*d* in the gate-on-arrays in the first and second TFT substrate 28, 56, according to a different embodiment. As seen in FIGS. 9A and 9B, the scanning pulses DG1, DG3, . . . , DGn−1 are provided by gate driver 88*a* to one side of the first TFT substrate 28, and the scanning pulses DG2, DG4, DGn are provided by gate driver 88*b* to another side of the first substrate 28. Similarly, in FIGS. 9C and 9D, the scanning pulses SG1, SG3, . . . , SGn−1 are provided by gate driver 88*c* to one side of the second TFT substrate 56, and the scanning pulses SG2, SG4, SGn are provided by gate driver 88*d* to another side of the second substrate 56. The shift registers in gate drivers 88*a*. 88*b*, 88*c* and 8*d* are said to perform interlaced scanning.

FIG. 10 illustrates the spatial relationship between the color pixel 110 in the first display panel 20 and the pixel cell 140 in the second display panel 50. As shown in FIG. 10, the color filter layer 118 comprises a plurality of color filter cells 120 arranged in a two-dimensional array (not shown). Only the area of one of the color filter cells 120 is shown. The color filter cell 120 has three color sub-cells 121, 122, 123. These three sub-cells are arranged to have different colors R (red), G (green), B (blue), for example. When the backlight unit 18 has a white light source 170 arranged to provide illumination to the display device 10, the three color sub-cells 121, 122, 123 are seen as three color sub-pixels 111, 112, 113 of a color pixel 110. The second display panel 50 does not have a color filter layer. The second TFT substrate 56, the second liquid crystal layer 58 and the support substrate 60, together with the associated polarizer elements, provide a plurality of pixel cells 140, each having three pixel sub-cells 141, 142, 143, in alignment with the color sub-cells 121, 122, 123 of a corresponding color filter cell 120. The pixel cells 140 are arranged to improve the contrast ratio of the display device 10.

According to an embodiment of the present invention, the color filter cells 120 formed on the color filter layer 118 has two color sub-cells 124, 125 as shown in FIG. 11A. These two color sub-cells are arranged to have two colors M (magenta) and G (green), for example. When the backlight unit 18' having a yellow light source 172 and a cyan light source 174 is arranged to provide illumination at alternate time periods to the display device 10, the two color sub-cells 124, 125 are seen as two color sub-pixels 114, 115 of a color pixel 110. The second display panel 50 does not have a color filter layer. However, the second TFT substrate 56, the second liquid crystal layer 58 and the support substrate 60, together with the associated polarizer elements, provide a plurality of pixel cells 140, each having two pixel sub-cells 144, 145, in alignment with the color sub-cells 124, 125 of a corresponding color filter cell 120. The pixel cells 140 are arranged to improve the contrast ratio of the display device 10.

Figure 11B:
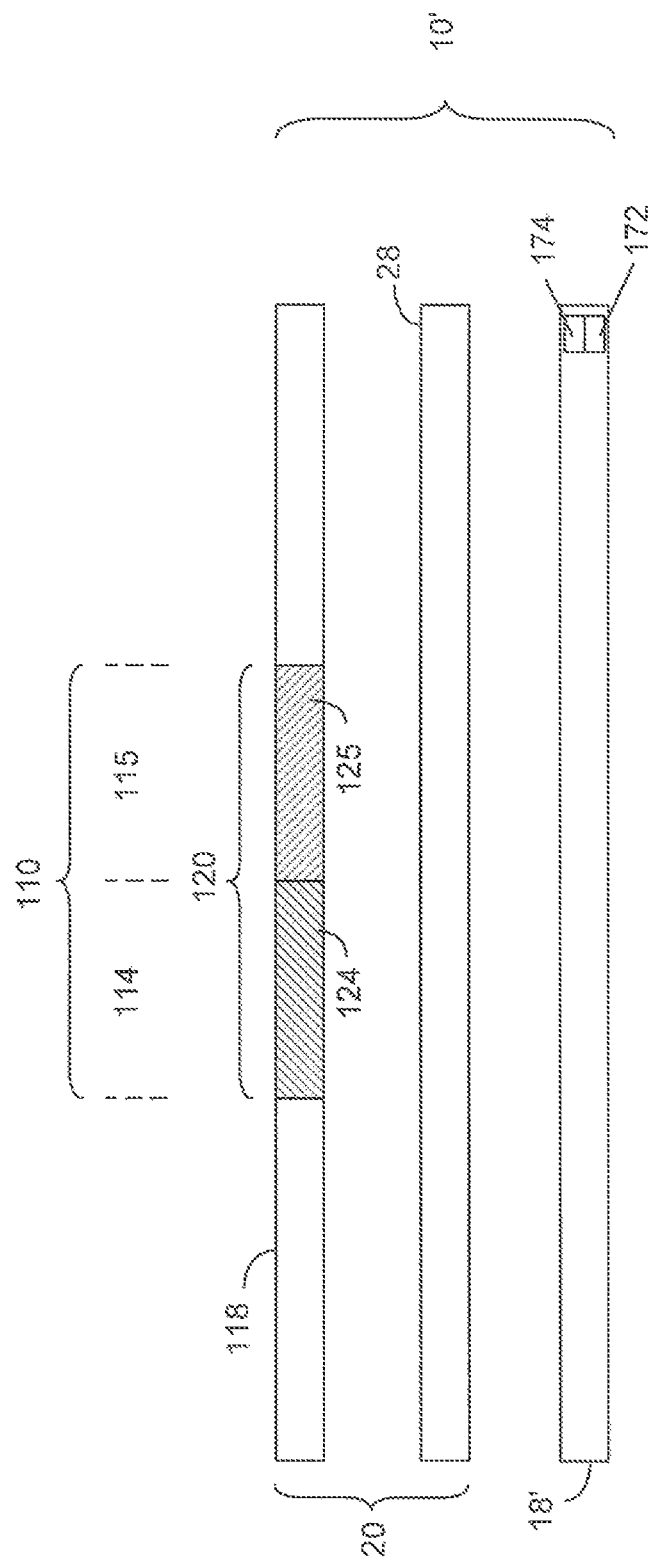
FIG. 11B illustrates the color filter cell, according to an embodiment of the present invention.

In a different embodiment of the present invention, the backlight unit 18' is used for illumination in a display device 10' without a second display panel 50, as shown in FIG. 11B.

As shown in FIG. 12A, a backlight unit 18 having a white light source 170 is arranged to provide illumination to the display device wherein the color filter cell 120 has three color sub-cells in R, G, B (see FIG. 10). The white light source 170 in the backlight unit 18 is arranged to turn on in the entire frame time.

Figure 12B:
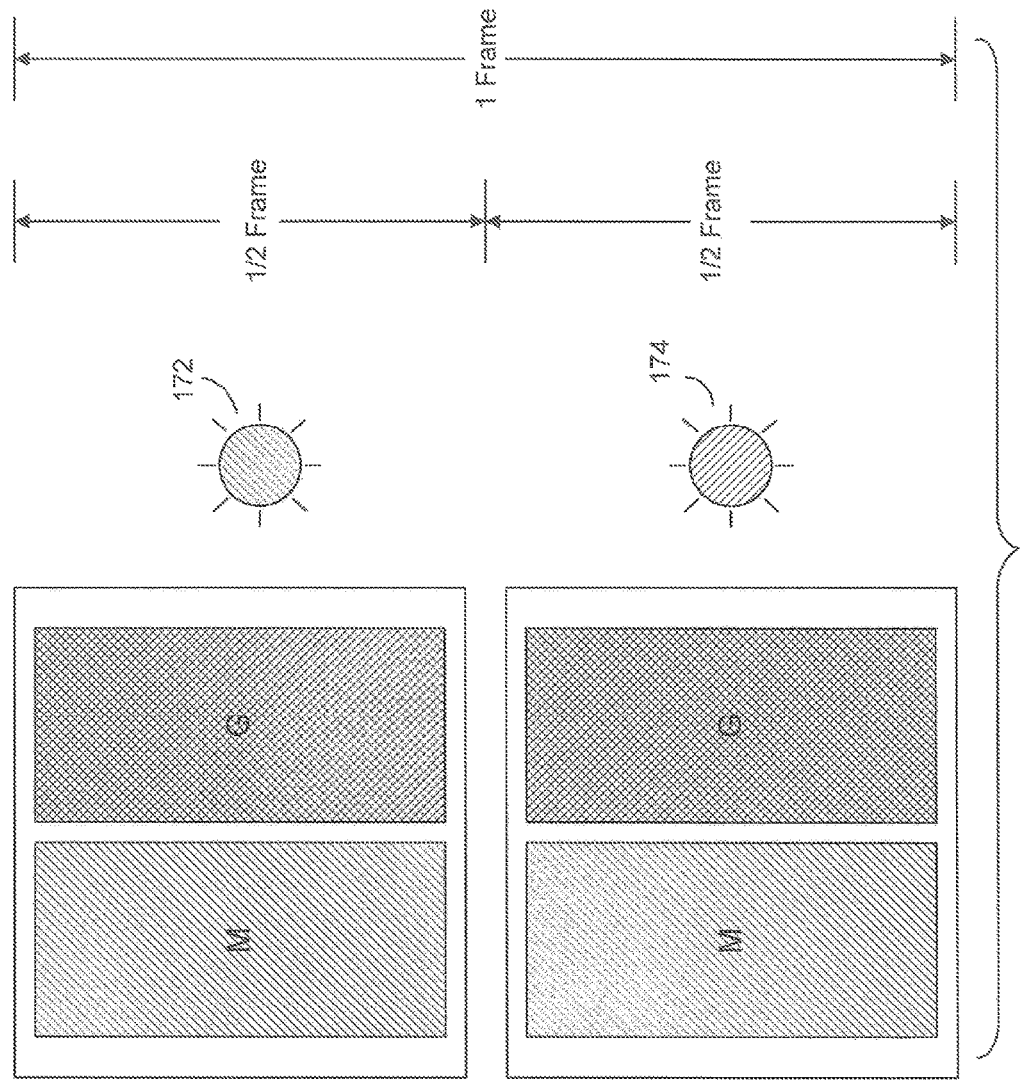
FIG. 12B illustrates the illumination timing periods for the color pixels, according to the embodiment as shown in FIGS. 11A and 11B.
Figure 13A:
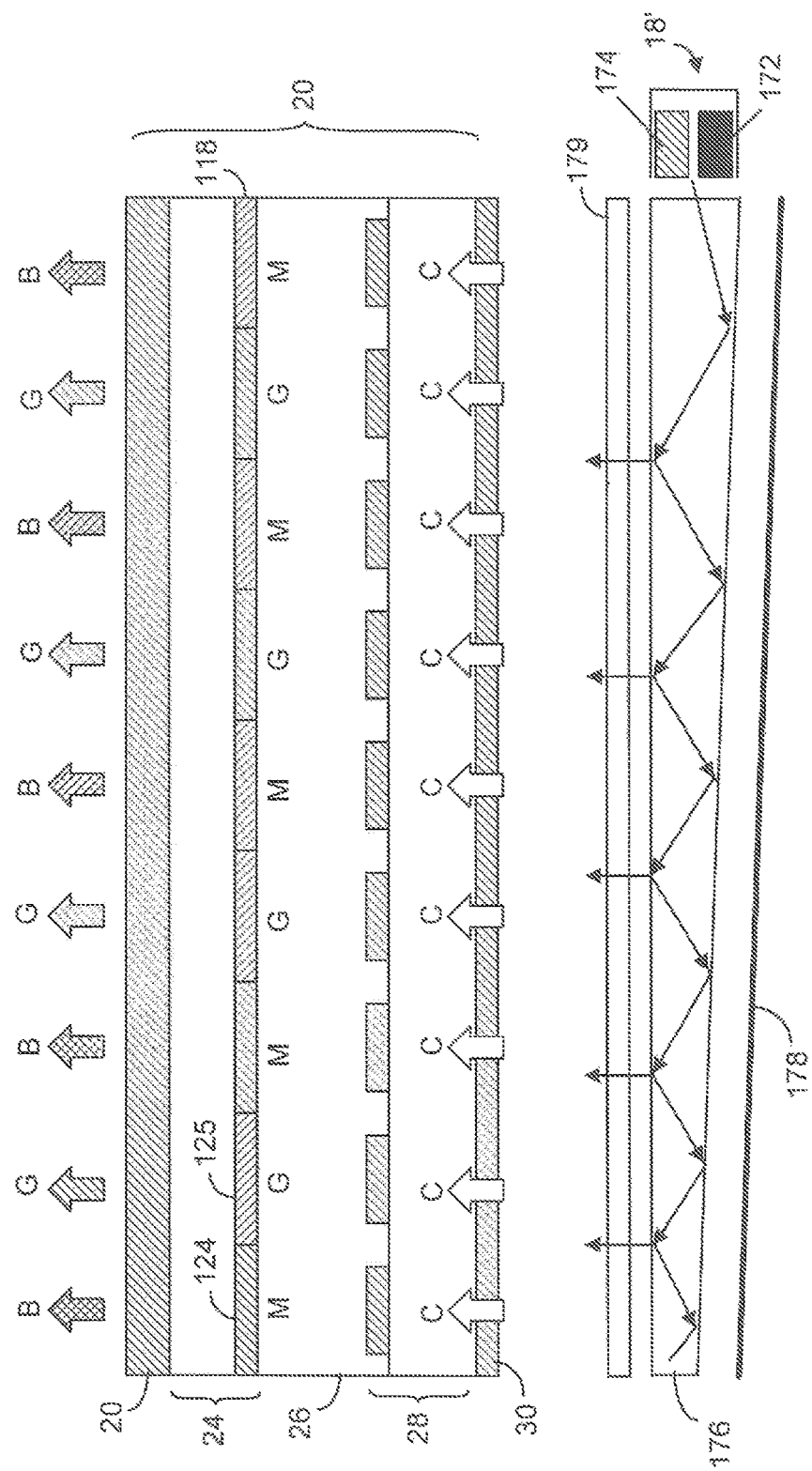
FIG. 13A illustrates the illumination on the pixel color elements on the first display panel from one light source, according to an embodiment of the present invention.
Figure 13B:
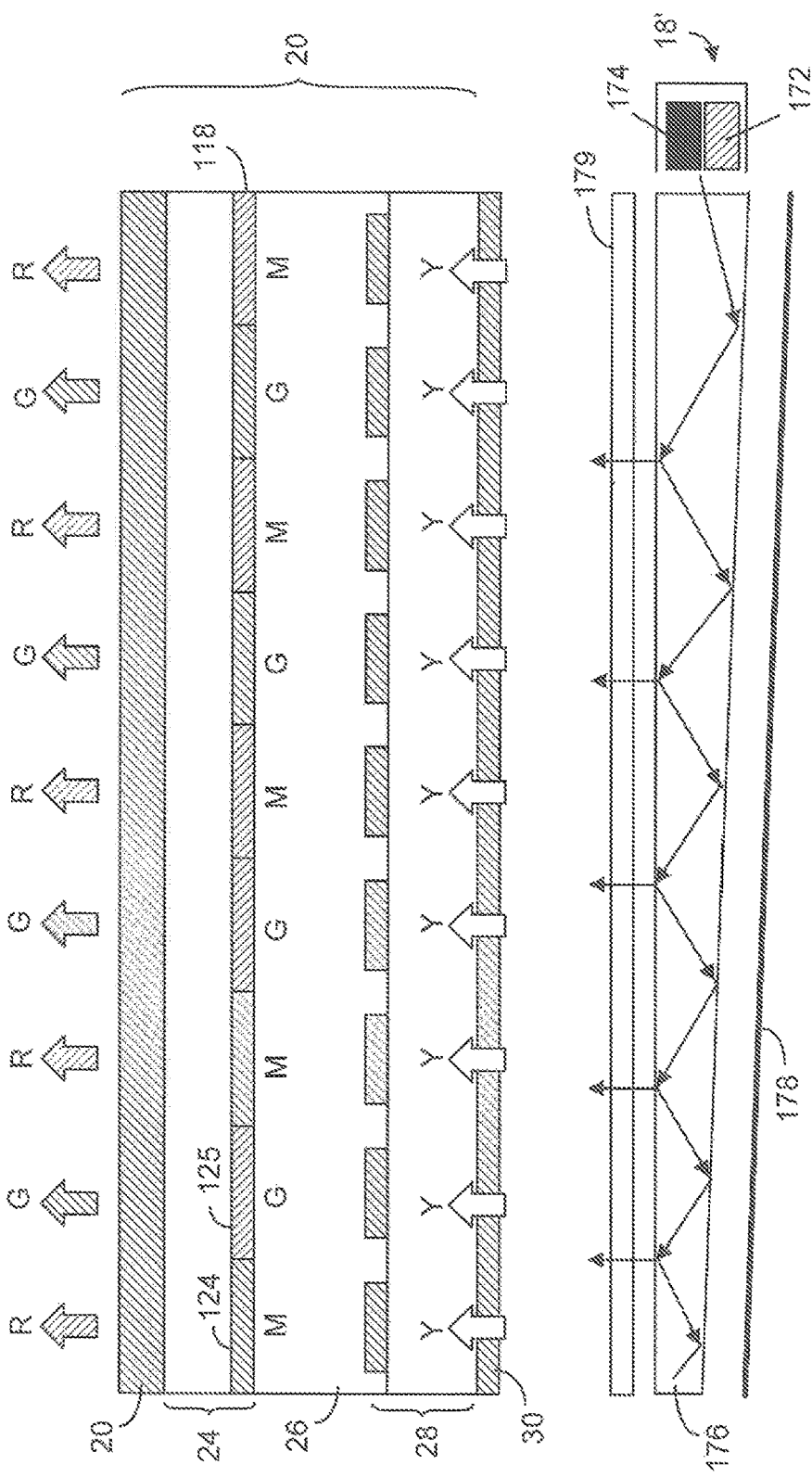
FIG. 13B illustrates the illumination on the pixel elements on the first display panel from another light source, according to an embodiment of the present invention.

As shown in FIG. 12B, a backlight unit 18' having a yellow light source 172 and a cyan light source 174 is arranged to provide illumination to a display device wherein the color filter cell 120 has two color sub-cells in M and G (see FIGS. 11A and 11B). The yellow light source 172 and the cyan light source 174 are alternately turned on within a frame time. As shown in FIG. 12B, the yellow light source 172 is turned on in one ½ frame time and the cyan light source 174 is turned on in the other ½ frame time. As a result, the illumination and the color filter cell 120 will provide three colors in R, G, B in a frame time. As illustrated in FIG. 13A, when cyan light is filtered by a magenta filter M, the filtered light is blue B. When cyan light is filtered by a green filter G, the filtered light is green G. As illustrated in FIG. 13B, when yellow light is filtered by a magenta filter M, the filtered light is red R. When yellow light is filtered by a green filter G, the filtered light is green G. Thus, when the yellow light source 172 and the cyan light source 174 are alternately turned on in a frame time as shown in FIG. 12B, the transmitted green light can be seen in the entire frame time, whereas the transmitted red light and the transmitted blue light can each be seen in different ½ times. As shown in FIGS. 13A and 13B, the backlight source 18' comprises a yellow light source 172 and a cyan light source 174. The light produced by these light sources is directed to a light guide plate 176. Through total reflection in the light guide plate 176 and/or by the reflection from the reflector 178, reflected light is used for providing back-lighting through a diffusive film 179.

Figure 14:
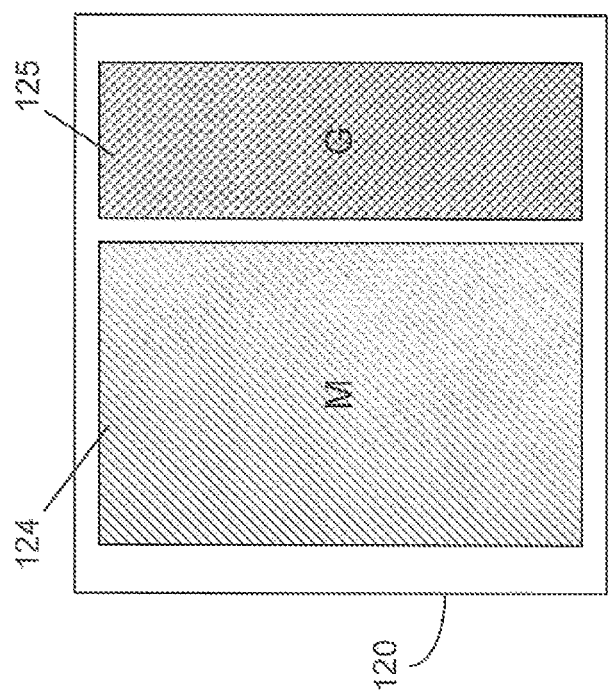
FIG. 14 illustrates the pixel color elements associated with the embodiment as shown in FIG. 12B, according to an embodiment of the present invention.

In an embodiment of the present invention, the area of the green sub-cell 125 is smaller than the area of the magenta sub-cell 124 as shown in FIG. 14.

According to an embodiment of the present invention, one of the polarizer element 30 and the polarizer element 54 as shown in FIG. 1 can be eliminated. Since the polarization axis of the polarizer element 30 is substantially parallel to the polarization axis of the polarizer element 54, one polarizer element can be eliminated if the diffuser 52 does not significantly affect polarization when light is scattered when passing through it.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A display device, comprising:
a first display panel and a second display panel arranged for stacking into a panel stack, the panel stack having a first stack side and an opposing second stack side;
a single color-filter substrate;
a diffuser located in the panel stack between the first display panel and the second display panel;
a backlight unit located in the panel stack near the second stack side;
a signal circuit, and
a signal connector having a first connector end and a second connector end, wherein
the first display panel comprises:
said color-filter substrate;
a first TFT substrate, and
a first liquid crystal layer disposed between said color-filter substrate and the first TFT substrate, and
the second display panel comprises:
a support substrate;
a second TFT substrate; and
a second liquid crystal layer disposed between the support substrate and the second TFT substrate, the support substrate disposed adjacent to the second liquid crystal layer, spaced from the second TFT substrate, the support substrate disposed between the backlight unit and the second liquid crystal layer, and
wherein the first connector end of the signal connector is electrically connected to the first TFT substrate, and the second connector end of the signal connector is electrically connected to the second TFT substrate, and wherein the signal circuit is arranged to provide electronic signals to the first TFT substrate, and also to provide the electronic signals to the second TFT substrate via the signal connector.

2. The display device according to claim 1, further comprising:
a first polarizer element disposed on said color-filter substrate, spaced from the first liquid crystal layer;
a second polarizer element disposed between the first TFT substrate and the second TFT substrate, and
a third polarizer element between the support substrate and the backlight unit, wherein the second TFT substrate is located between the second polarizer element and the second liquid crystal layer.

3. The display device according to claim 1 further comprising:
a first polarizer element disposed on said color-filter substrate, spaced from the first liquid crystal layer;
a second polarizer element disposed between the first TFT substrate and the diffuser;
a third polarizer element disposed between the diffuser and the second TFT substrate, and
a fourth polarizer element disposed between the support substrate and the backlight unit, wherein the second TFT substrate is located between the third polarizer element and the second liquid crystal layer.

4. The display device according to claim 3, wherein the first polarizer element comprises an optical polarizer; the second polarizer element comprises a wire-grid polarizer, the third polarizer element comprises a wire-grid polarizer and the fourth polarizer element comprises a wire-grid polarizer.

5. The display device according to claim 1, wherein
the first display panel comprises a plurality of color pixels arranged in a two dimensional array comprising a plurality of pixel rows along a first direction and a plurality of pixel columns along a different second direction, and
the second display panel comprises a plurality of pixel cells arranged in a two dimensional array comprising a plurality of cell rows along the first direction and a plurality of cell columns along the second direction, each of the plurality of pixel cells corresponding to and substantially aligned with a corresponding one of the plurality of color pixels in the display stack in a third direction, the third direction substantially perpendicular to the first direction and perpendicular to the second direction.

6. The display device according to claim 5, wherein the signal circuit comprises a signal driver circuit and a timing control circuit and the electronic signals comprise data signals and timing signals, the signal driver circuit arranged to provide the data signals and the timing control circuit arranged to provide the timing signals to the first TFT substrate and the second TFT substrate.

7. The display device according to claim 6, wherein each of the first TFT substrate and the second TFT substrate has a plurality of gate lines, including a first gate line and a last gate line, wherein the last gate line of the first TFT substrate is located adjacent to the first connector end of the signal connector and the last gate line of the second TFT substrate is located adjacent to the second connector end of the signal connector.

8. The display device according to claim 7, wherein the first TFT substrate comprises a first glass substrate and the second TFT substrate comprises a second glass substrate, each of the first glass substrate and the second glass substrate comprises a first substrate side and an opposing second substrate side, wherein
the first substrate side of the first glass substrate comprises a first gate driver, and the second substrate side of the first glass substrate comprises a second gate driver, and
the first substrate side of the second glass substrate comprises a third gate driver, and the second substrate side of the second glass substrate comprises a fourth gate driver, and wherein the first gate driver and the second gate driver are arranged to receive the timing signals from the signal driver circuit and to provide gate line signals to the plurality of gate lines in the first TFT substrate, and the third gate driver and the fourth driver are arranged to receive the timing signals from the signal driver circuit and to provide gate line signals to the plurality of gate lines in the second TFT substrates.

9. The display device according to claim 8, wherein the gate line signals provided to the gate lines in the first TFT substrate by the first gate driver and the gate line signals provided to the gate lines in the first TFT substrate by the second gate driver are the same, and wherein the gate line signals provided to the gate lines in the second TFT substrate by the third gate driver and the gate line signals provided to the gate lines in the second TFT by the fourth gate driver are the same.

10. The display device according to claim 8, wherein the gate line signals provided to the gate lines in the first TFT substrate by the first gate driver and the gate line signals provided to the gate lines in the first TFT substrate by the second gate driver are arranged in an interlaced manner, and wherein the gate line signals provided to the gate lines in the second TFT substrate by the third gate driver and the gate line signals provided to the gate lines in the second TFT substrate by the fourth gate driver are arranged in an interlaced manner.

11. The display device according to claim 8, wherein the gate line signals to the first gate line in the first TFT substrate and the gate line signals to the first gate line in the second TFT substrate are simultaneously provided, and wherein the gate line signals to the last gate line in the first TFT substrate and the gate line signals to the last gate line in the second TFT substrate are simultaneously provided.

12. The display device according to claim 8, wherein each of the first gate driver, the second gate driver, the third gate driver and the fourth gate driver comprises a plurality of shift registers arranged to provide the gate line signals in a sequential manner.

13. The display device according to claim 6, wherein said color-filter substrate comprises a first base substrate and a color filter layer disposed on the first base substrate, the color filter layer comprising a plurality of color-filter cells, each color-filter cell associated with a corresponding one of the plurality of color pixels.

14. The display device according to claim 13, wherein each of the color filter cells comprises a red filter cell, a green filter cell and a blue filter cell, and wherein the backlight unit comprises a white-light source.

15. The display device according to claim 13, wherein each of the color filter cells comprises a magenta filter cell and a green filter cell, and wherein the backlight unit comprises two light sources, comprising a yellow light source and a cyan light source.

16. The display device according to claim 14, wherein the signal driver circuit is arranged to provide the data signals to the plurality of color pixels in the first display panel and to the plurality of pixel cells in the second display panel in a frame time, the frame time comprises a first half-frame time and a second half-frame time, and wherein the two light sources are alternately turned on with one of the two light sources arranged to turn on in the first half-frame time, and the other of the two light sources arranged to turn on in the second half-frame time.

17. The display device according to claim 15, wherein an area of the green filter cell is smaller than an area of the magenta filter cell.

18. The display device according to claim 2, wherein the second polarizer element is disposed between the first TFT substrate and the diffuser, said display device further comprising:
a further polarizer element disposed between the diffuser and the second TFT substrate.

\* \* \* \* \*